United States Patent [19]

Chang et al.

[11] Patent Number: 4,504,619
[45] Date of Patent: Mar. 12, 1985

[54] TRIMELLITIC ANHYDRIDE-CONTAINING UNSATURATED POLYESTERS

[75] Inventors: Robert C. Chang, Newark; Dale E. McCoy, Granville, both of Ohio

[73] Assignee: Owens-Corning Fiberglas Corporation, Toledo, Ohio

[21] Appl. No.: 180,762

[22] Filed: Aug. 25, 1980

Related U.S. Application Data

[63] Continuation of Ser. No. 65,798, Aug. 13, 1979, abandoned.

[51] Int. Cl.³ .................. C08L 67/06; D02G 3/00
[52] U.S. Cl. ........................ 524/524; 65/3.41; 65/3.43; 428/391; 428/392; 524/528; 524/539
[58] Field of Search ............... 428/375, 378, 391, 392; 260/29.2 E; 65/3; 528/296; 524/524, 528, 539

[56] References Cited

U.S. PATENT DOCUMENTS

| 2,723,215 | 11/1955 | Biefeld et al. | 428/378 |
| 2,855,373 | 8/1958 | Guenther | 260/29.6 NR |
| 2,931,739 | 4/1960 | Marzocchi et al. | 428/391 |
| 3,067,179 | 12/1962 | Frey | 528/296 |
| 3,197,439 | 7/1965 | Frey | 528/296 |
| 3,418,094 | 12/1968 | Marsden et al. | 65/3 |
| 3,429,760 | 2/1969 | Roskos | 65/3.44 |
| 3,502,620 | 3/1970 | Caldwell | 528/296 X |
| 3,556,754 | 1/1971 | Marsden et al. | 65/3 |
| 3,715,233 | 2/1973 | Harrier | 528/296 X |
| 3,920,596 | 11/1975 | Furukawa et al. | 428/392 X |
| 3,936,285 | 2/1976 | Maaghul | 428/378 X |
| 3,947,615 | 3/1976 | Fry | 428/392 X |
| 4,168,345 | 9/1979 | deMassey | 428/392 X |

Primary Examiner—Lorraine T. Kendell
Attorney, Agent, or Firm—Ronald C. Hudgens; Philip R. Cloutier; Greg Dziegielewski

[57] ABSTRACT

A glass size composition comprising a trimellitic anhydride anhydride-containing unsaturated polyester imparts to glass fibers superior reinforcing characteristics when used to reinforce sheet molding compounds.

10 Claims, No Drawings

TRIMELLITIC ANHYDRIDE-CONTAINING UNSATURATED POLYESTERS

This is a continuation of application Ser. No. 65,798, filed Aug. 13, 1979, now abandoned.

BACKGROUND OF THE INVENTION

This invention relates to unsaturated polyesters.

In one of its more specific aspects, this invention relates to the use of unsaturated polyesters in glass sizes and products produced therefrom.

The use of sizes for glass fibers is well known. Such sizes usually contain one or more materials which act to improve various properties of the glass as well as and to protect the glass during processing.

There has now been discovered a material which, when incorporated in a glass size, acts to improve both the processability and choppability of the glass when gathered into rovings. In turn, this roving improves the physical properties of sheet molding compounds into which the roving is incorporated for reinforcing purposes.

SUMMARY OF THE INVENTION

According to this invention there is provided a glass size composition comprising a trimellitic anhydride-containing unsaturated polyester.

Also according to this invention there is provided at least one glass fiber having at least a portion of its surface coated with a composition comprising a trimellitic anhydride-containing polyester.

Also according to this invention, there is provided a sheet molding composition containing glass fibers coated with a composition comprising a trimellitic anhydride-containing polyester.

DESCRIPTION OF THE PREFERRED EMBODIMENTS

The unsaturated polyesters employed in the size composition of this invention are formed by reacting one or more dibasic acids with one or more glycolic components according to the formula:

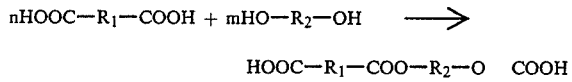

$$nHOOC-R_1-COOH + mHO-R_2-OH \longrightarrow$$
$$HOOC-R_1-COO-R_2-O \quad COOH$$

wherein n and m, in molar relationships, are such that $2m > n > m$. Preferably, if $n=1$, m will have a value within the range of from about 0.95 to about 2.

In the dibasic acids used, $R_1$ can be selected from the group consisting of

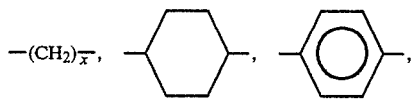

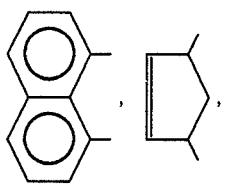

and their derivatives and isomers. x, above, can have a value of 3 to 5. Preferably, the dibasic acids will be materials such as isophthalic acid, terephthalic acid and their esters employed in the amount of x mole(s) and (n-x) mole(s) of at least one $\alpha,\beta$, ethylenically unsaturated dibasic acid or anhydride, such as maleic anhydride, with x, preferably, having a value within the range of from about 0.25n and 0.75n. In addition, a trimellitic anhydride in an amount within the range of from about 2.5 to about 10 mole percent of total dibasic acid can also be incorporated into the polyester.

In the glycolic components used, $R_2$ can be selected from the group consisting of

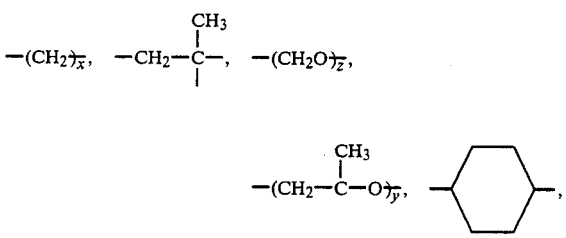

$-CH_2-R'-CH_2-$ where $R'$ can be aliphatic groups such as

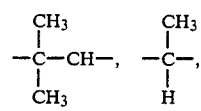

or aromatic groups such as

where x has a value from 2 to 8, z has a value of from 2 to 8 and y has a value of from 1 to 4.

Preferably, glycols such as 2,2,4-trimethyl pentanediol, neopentyl glycol or propylene glycol can be used. The glycols can be employed individually or in combination with up to about 1 mol percent of a multifunctional glycol, such as trimethylolpropane.

The polyester can be prepared in a one-stage reaction but preferably it is prepared in a two-stage reaction, the first stage reaction reacting all of the glycol with the dibasic acid at temperatures up to 210° C. under atmospheric pressure until the condensation product has an acid number within the range of from about 10 to about 30.

In the second stage reaction, the condensation product is reacted with maleic anhydride and trimellitic anhydride at temperatures up to 210° C. under atmospheric pressure until the product has an acid number within the range of from about 70 to about 110.

The unsaturated polyester thus obtained is converted to an oil-in-water emulsion and the emulsion is employed in a glass size composition comprising conventional components. The resulting size is applied to glass fibers at forming in the usual manner and the sized fibers in the form of rovings are employed in sheet molding compounds in conventional amounts in the conventional manner to provide laminates.

The best mode of practicing the invention is set forth in the following examples.

EXAMPLE I

Polyester Preparation

A first stage reaction mixture was formed of 986.0 grams of iso-phthalic acid (IPA) (95% purity), 1769.3 grams of 2,2,4-trimethylpentane diol (TMPD) and 6.9 grams of dibutyltin oxide (DBTO), as catalyst, by melting all the TMPD and adding all the IPA under a nitrogen atmosphere. The temperature was maintained at about 210° C. for about 4 hours during which period about 196 grams of water were withdrawn from the reaction mixture.

The reaction mixture was permitted to cool to 160° C. at which temperature 228.1 grams trimellitic anhydride were added. The resulting mixture was allowed to cool to about 100° C. over a period of 1 hour at which temperature 583.3 grams of maleic anhydride were added. When the temperature of the resulting mixture had decreased to 71° C., the mixture was heated to 90° C. over a period of 15 minutes after which 2 grams of DBTO were added. The resulting exothermic reaction caused the reaction mixture to increase in temperature to 110° C. in about 15 minutes, after which the temperature was maintained between 178° C. and 200° C. for a period of 3½ hours, during which period 76.7 grams of water were withdrawn and during which period, after 2 hours, 0.1 grams of toluhydroquinone (THQ) was added.

The unsaturated polyester resin thus obtained was then converted to an oil-in-water phase emulsion. For this purpose, the polyester resin was diluted with an organic solvent, such as diacetone alcohol or cellosolve acetate, to about a 75 to about a 95 percent concentration. Monomeric solvents, such as styrene, are not to be considered as solvents for the polyester.

A nonionic sufactant was then added to the resulting solution in an amount of about 10 percent by weight of the total resulting composite. A preferred nonionic surfactant is a low molecular weight copolymer of ethylene oxide and propylene oxide.

The resulting mixture was then emulsified to about 50 to about 55 percent solids with water, while vigorously agitating. The emulsion thus obtained should have a weight average particle size within the range of from about 0.1 to about 1.5μ.

EXAMPLE II

Preparation of the Polyester Emulsion

When the temperature of the polyester prepared in Example I had decreased to about 140° C., to the polyester were added 36 grams of a nonionic surfactant. After the resulting mixture had cooled to 135° C., 195.6 grams of diacetone alcohol were added, with stirring. To the resulting mixture were then added about 1500 grams of deionized water, and the resulting combination was agitated to produce an oil-in-water emulsion having a total solids of 50% and a particle size of 1.53μ.

The resulting emulsion was then employed as the film former in a typical glass size consisting of polyvinyl acetate, a lubricant, acetic acid, a silane and deionized water.

EXAMPLE III

This example demonstrates the preparation of a typical size formulation employing the polyester emulsion of this invention.

30 gallons of demineralized water were added to a premix tank and while stirring, 445 pounds of the polyester emulsion were added. Agitation was continued for 5 minutes. This Premixture I was introduced into a main mix tank as were 10 gallons of demineralized water used to rinse out the premix tank.

Premixture II was formed by adding 284.5 pounds of polyvinyl acetate (25-1037 from National Starch) a homopolymer of vinyl acetate to 45 gallons of demineralized water and agitating for five minutes. Two such Premixtures II were so prepared and successively introduced into the main mix tank.

Premixture III was formed by adding 190 pounds of polyethylene emulsion (A-400, from Air Products), a homopolymer of ethylene, to 45 gallons of demineralized water and agitating the mixture for five minutes. This premixture was added to the main mix tank.

Premixture IV was formed by adding 1.9 pounds of acetic acid to 75 gallons of demineralized water, mixing thoroughly, and introducing into the solution 25.2 pounds of gamma-methacryloxypropyltrimethoxysilane (A-174 by Union Carbide) at a rate of 2 pounds per minute. After 25 minutes of mixing, Premixture IV was added to the main mix tank.

Premixture V was formed by dissolving 12.6 pounds of polyethylene condensate (Emery 6717) therein. The solution was added to the main mix tank.

The contents of the main mix tank were then agitated for 15 minutes and employed as a size for glass strands in the conventional manner. After drying for 16 hours at 265° F., rovings were prepared and the rovings were employed in a conventional SMC at a glass loading of 30%.

The glass reinforced polyester-based SMC was then molded into 12"×18" panels which were aged about one week at room temperature. The molded panels were then tested to determine their physical properties. These properties were compared with a commercial polyester-based, glass reinforced SMC (commercial) with the following results:

| SMC | Dry Flexural | | 2 Hr Soil Flexural Modulus | | Tensile | | Barcol Hardness |
| | Strength, psi × $10^3$ | Modulus psi × $10^3$ | Strength, psi × $10^3$ | Modulus, psi × $10^3$ | Strength, psi × $10^3$ | Modulus psi × $10^3$ | |
| --- | --- | --- | --- | --- | --- | --- | --- |
| Invention | 30.44 | 2.138 | 28.86 | 1.777 | 13.11 | 2.215 | 58 |
| Commercial | 26.72 | 2.282 | 25.22 | 1.772 | 11.05 | 1.860 | 57 |

It can be seen from the above that the glass sized with the polyester based size of this invention imparts superior properties to SMC when incorporated therein.

We claim:

1. A glass sizing composition comprising a water-insoluble polyester, polyvinyl acetate and a polyethylene emulsion, said polyester being produced by reacting a glycol and a dibasic acid to form a condensation product and reacting said condensation product with maleic anhydride and trimellitic anhydride.

2. The composition of claim 1 in which the amount of trimellitic anhydride employed is in an amount within the range of from about 2.5 to about 10 mole percent of said dibasic acid.

3. The composition of claim 1 in which said polyester is employed in the form of an oil-in-water emulsion.

4. The composition of claim 1 in which said condensation product is formed frpom isophthalic acid and 2,2,4-trimethylpentane diol.

5. The composition of claim 1 in which said glycol comprises neopentyl glycol or propylene glycol.

6. The composition of claim 4 in which said diol is employed with up to about 1 mole percent of a multifunctional glycol.

7. The composition of claim 3 in which said emulsion comprises diacetone alcohol or cellosolve acetate.

8. At least one glass fiber having at least a portion of its surface in contact with the residue formed upon removal of water from the composition of claim 1.

9. At least one glass fiber having at least a portion of its surface in contact with the residue formed upon removal of water from the composition of claim 6.

10. A sheet molding composition comprising the glass fibers of claim 8.

* * * * *